US012722275B2

(12) United States Patent
Ferrari

(10) Patent No.: US 12,722,275 B2
(45) Date of Patent: Sep. 1, 2026

(54) HEX BIT HOLDER SYSTEM

(71) Applicant: 1046959 Ontario Inc., Burlington (CA)

(72) Inventor: Marco Sixtus Ferrari, Hamilton (CA)

(73) Assignee: 1046959 Ontario Inc., Burlington (CA)

( * ) Notice: Subject to any disclaimer, the term of this patent is extended or adjusted under 35 U.S.C. 154(b) by 162 days.

(21) Appl. No.: 18/423,507

(22) Filed: Jan. 26, 2024

(65) Prior Publication Data

US 2025/0222584 A1 Jul. 10, 2025

(30) Foreign Application Priority Data

Jan. 10, 2024 (CA) ................................ CA 3225781

(51) Int. Cl.
*B25H 3/00* (2006.01)
*B25H 3/04* (2006.01)

(52) U.S. Cl.
CPC ............... *B25H 3/003* (2013.01); *B25H 3/04* (2013.01)

(58) Field of Classification Search
CPC ... B25H 3/00; B25H 3/02; B25H 3/04; B25H 3/06; B25H 3/003; B25H 3/021; B25H 3/023; B65D 25/107; B65D 25/108; B65D 25/105
See application file for complete search history.

(56) References Cited

U.S. PATENT DOCUMENTS 5,535,882 A * 7/1996 Liu ........................ B25H 3/003 224/679
5,544,744 A * 8/1996 Oman ...................... B25H 3/06 220/555
5,570,784 A * 11/1996 Sidabras ................ B25H 3/003 206/378
6,119,859 A * 9/2000 Wen ......................... B25H 3/06 206/372
6,145,662 A * 11/2000 Newton ................... B25H 3/06 206/483
6,436,357 B1 * 8/2002 Frieze ....................... A61L 2/26 422/292
6,783,004 B1 * 8/2004 Rinner ............... A61B 17/8875 206/370
6,991,103 B2 * 1/2006 Chen ...................... B25H 3/003 206/379
7,246,704 B2 * 7/2007 Brunson ................ B25H 3/003 220/23.88
7,325,682 B2 * 2/2008 Seymour ................ B25H 3/003 206/754
8,069,984 B2 * 12/2011 Larson ................... B25H 3/023 206/372

(Continued)

FOREIGN PATENT DOCUMENTS

AU 2014377017 A1 * 8/2016 ............... B25H 3/02

*Primary Examiner* — Patrick D Hawn
(74) *Attorney, Agent, or Firm* — The Webb Law Firm

(57) ABSTRACT

A hex bit holder system, including one of more hex bit holders and a platform for the hex bit holders. The holders may include hexagonal shaped cavities or U-shaped clips to hold the hexagon shape of a hex bit vertically or horizontally, respectively. A hex bit holder system includes one or more platforms each with one or more first hex bit holders and/or second hex bit holders, which one or more platforms may be attached to a peg board in various configurations. A kit for a hex bit holder system is included of one or more platforms with one or more hex bit holders.

3 Claims, 10 Drawing Sheets

(56) References Cited

U.S. PATENT DOCUMENTS

| | | | | |
|---|---|---|---|---|
| 8,371,444 | B1 * | 2/2013 | Huang | B25H 3/003 206/374 |
| 8,505,720 | B2 * | 8/2013 | Huang | B65D 85/00 206/349 |
| 8,770,418 | B2 | 7/2014 | Ernst | |
| 8,899,417 | B1 * | 12/2014 | Chen | B25H 3/003 206/375 |
| 9,156,156 | B2 * | 10/2015 | Wang | B25H 3/021 |
| 9,364,949 | B2 * | 6/2016 | Ernst | B25H 3/06 |
| 9,403,270 | B2 * | 8/2016 | Lin | B25H 3/022 |
| 9,625,143 | B2 * | 4/2017 | Hsu | B25H 3/003 |
| 9,656,384 | B1 * | 5/2017 | Tsai | B25H 3/003 |
| 9,694,489 | B2 * | 7/2017 | Steele | B65D 25/205 |
| 9,827,664 | B1 * | 11/2017 | Chen | B25H 3/003 |
| 10,449,665 | B2 * | 10/2019 | Ernst | B25H 3/003 |
| 10,618,159 | B2 * | 4/2020 | Maruzzo | B25H 3/04 |
| 11,453,113 | B1 * | 9/2022 | Hsieh | B25H 3/06 |
| 11,491,637 | B2 * | 11/2022 | Miley | B25H 3/023 |
| 11,759,942 | B2 * | 9/2023 | Hohl | B25H 3/06 206/379 |
| 2003/0234196 | A1 * | 12/2003 | Hu | B25H 3/04 206/372 |
| 2004/0154942 | A1 * | 8/2004 | Streich | E05B 65/5238 206/349 |
| 2005/0211587 | A1 * | 9/2005 | Chen | B25H 3/003 206/349 |
| 2005/0241974 | A1 * | 11/2005 | Chen | B25H 3/003 206/349 |
| 2014/0165293 | A1 * | 6/2014 | Hermansen | B25B 27/0071 7/168 |
| 2016/0052125 | A1 * | 2/2016 | Steele | B65D 25/205 206/349 |
| 2016/0107308 | A1 * | 4/2016 | Hsu | B25H 3/003 206/349 |
| 2016/0339581 | A1 * | 11/2016 | Brinkhuis | A47F 7/0028 |
| 2017/0027411 | A1 * | 2/2017 | Gobl | A47L 15/50 |
| 2017/0361454 | A1 * | 12/2017 | Hsu | B25H 3/003 |
| 2021/0078159 | A1 * | 3/2021 | Jiang | B65D 21/0213 |
| 2023/0347498 | A1 * | 11/2023 | Steinberg | B25H 3/04 |
| 2025/0083298 | A1 * | 3/2025 | Fischer | B25H 3/003 |

* cited by examiner 30
31
32
33
34
35
37
38
39

HEX BIT HOLDER SYSTEM

CROSS-REFERENCE TO RELATED APPLICATION

This application claims priority to Canadian Patent Application No. 3,225,781 filed Jan. 10, 2024, the disclosure of which is hereby incorporated by reference in its entirety.

BACKGROUND OF THE INVENTION

Field of the Invention

The present invention relates to a hex bit holder system, and more specifically to a hex bit holder system comprising one or more holders for holding hex bits and a platform for the hex bit holders.

Description of Related Art

Toolboxes, tool belts, and peg boards are used for holding tools. With such holders, the tools are not scattered about and can be located when needed. Smaller tools can still be difficult to store and locate and compartments can assist by separating tools and holding groups of small tools together. For example, toolboxes may contain removable boxes on top containing smaller tools and bigger tools underneath at the bottom of the box.

Some tools or tool components are very small, easily lost, and difficult to organize, for example, hex bits. Hex bits are hexagonally shaped at one end to fit into a power drill or manual tool and the other end is shaped for a screw or nut. Hex bits come in different sizes to fit in different size screws or nuts, and it is advantageous to organize them for ease of selecting the appropriate tool. For example, hex bits may be organized by type of bit, for example, by square bit or star bit or nut driver, and within those groups by size order so that the correct size for a screw or nut is quicker to find.

Hex bits may be sold individually or as a set. A boxed set of hex bits typically includes some method of organization, such as, forms that fit different size hex bits to keep the hex bits organized by size and type. Several boxes of sets of hex bits may be needed to have all the desired hex bit types and sizes, however, each box needs to be opened to find the right hex bit. Large boxes of hex bits are unwieldy to store and carry around.

Tools may be hung on a peg board, a board perforated with holes, for ease of selecting the correct tool, and to avoid having to open a toolbox. Peg boards may be hung on a wall or laid flat on a table or in a drawer in a tool chest. A peg board may have multiple attachment means which are attached to the peg board on one end by using the holes in the peg board and hold a tool at the other end. Even small tool components such as sockets may be hung on individual attachment means that are each attached to a hole and hold a socket. Placing an attachment means in each hole for multiple sockets is time consuming and its difficult to keep multiple sockets from falling off when the peg board is on a wall. U.S. Pat. No. 8,770,418 dated Jul. 8, 2014, of Ernst Manufacturing Inc. describes a clip for holding sockets for attachment to an organizer rail. Currently this company has further tool bit organizers including blocks with holes for hex bits, which tool bit organizers fit on an organizer rail that may be attached to a peg board. It is difficult to remove the hex bits from the holes in the blocks, the tool bit organizers are fixed sizes, not adjustable, and the system is not adaptable.

What is needed is a hex bit holder system that holds multiple and different types and sizes of hex bits, can be easily expanded for more hex bits or for different size hex bits, and which can all be attached to a peg board if desired.

SUMMARY OF THE INVENTION

In an embodiment of the present invention there is a first hex bit holder comprising a base with a row of cavities, each cavity being hexagonally shaped, open at the top, with a further opening across a lower half, and wherein a flexible tab extends from the top of each cavity bisecting and curving into the opening.

In a further embodiment of the present invention there is a first hex bit holder comprising a base with two rows of cavities, each cavity being hexagonally shaped, open at the top, with a further opening across a lower half, and wherein a flexible tab extends from the top of each cavity bisecting and curving into the opening.

The first hex bit holder may have six cavities in each of the rows.

In a further embodiment of the present invention there is a second hex bit holder comprising a base with a row of clips, each clip comprising two flexible arms having a U shape.

The second hex bit holder may have 6 clips in the row.

One or more of the two flexible arms of each of the clips of the second bit holder may additionally comprise a retaining bump.

In a further embodiment of the present invention there is a platform for hex bit holders comprising a body with two parallel rows of recessed positioning stops running from a first end of the platform to a second end of the platform and two parallel recessed guide channels running between the two rows of recessed positioning stops, wherein the recessed guide channels are open at the first end and at the second end of the platform.

The platform for hex bit holders may additionally comprise an end bump in each recessed guide channel adjacent the first end of the platform and an end bump in each recessed guide channel adjacent the second end of the platform.

The first hex bit holder may additionally comprise a pair of first hex bit holder positioning bumps and a pair of first hex bit holder guide tabs on a bottom of the first hex bit holder base.

The first hex bit holder may additionally comprise a pair of first hex bit holder slide guides which extend widthwise in a substantially L-shape under and parallel to the first hex bit holder base.

The second hex bit holder may additionally comprise a pair of second hex bit holder positioning bumps and a pair of second hex bit holder guide tabs at a bottom of the second hex bit holder base.

The second hex bit holder may additionally comprise a pair of second hex bit holder slide guides which extend widthwise in a substantially L-shape under and parallel to the second hex bit holder base.

This first hex bit holder may have six cavities in each of the rows.

This second hex bit holder may have 6 clips in the row and each of the flexible arms of each of the clips additionally comprises a retaining bump.

In a further embodiment of the present invention there is a hex bit holder system comprising a platform for hex bit holders and at least one of the first hex bit holders and/or at least one of the second hex bit holders.

In a further embodiment of the present invention there is a platform for hex bit holders which additionally comprises a pair of platform pins at a first end of the platform and a pair of platform pins at a second end of the platform, and wherein the platform may be secured to a peg board comprising a board with holes, by inserting the platform pins into the holes.

The platform may additionally comprise at least one recess through the platform, and the platform may be further secured to the peg board by screwing a screw through the recess into a hole in the peg board.

In a further embodiment of the present invention there is a kit for a hex bit holder system comprising one or more of the platforms and one or more of the first hex bit holders and/or one or more of the second hex bit holders.

BRIEF DESCRIPTION OF THE DRAWINGS

The terms Fig., Figs., Figure, and Figures are used interchangeably in the specification to refer to the corresponding figures in the drawings.

These and other aspects of the present invention will be apparent from the brief description of the drawings and the following detailed description in which.

DESCRIPTION OF THE INVENTION

Figure 1:
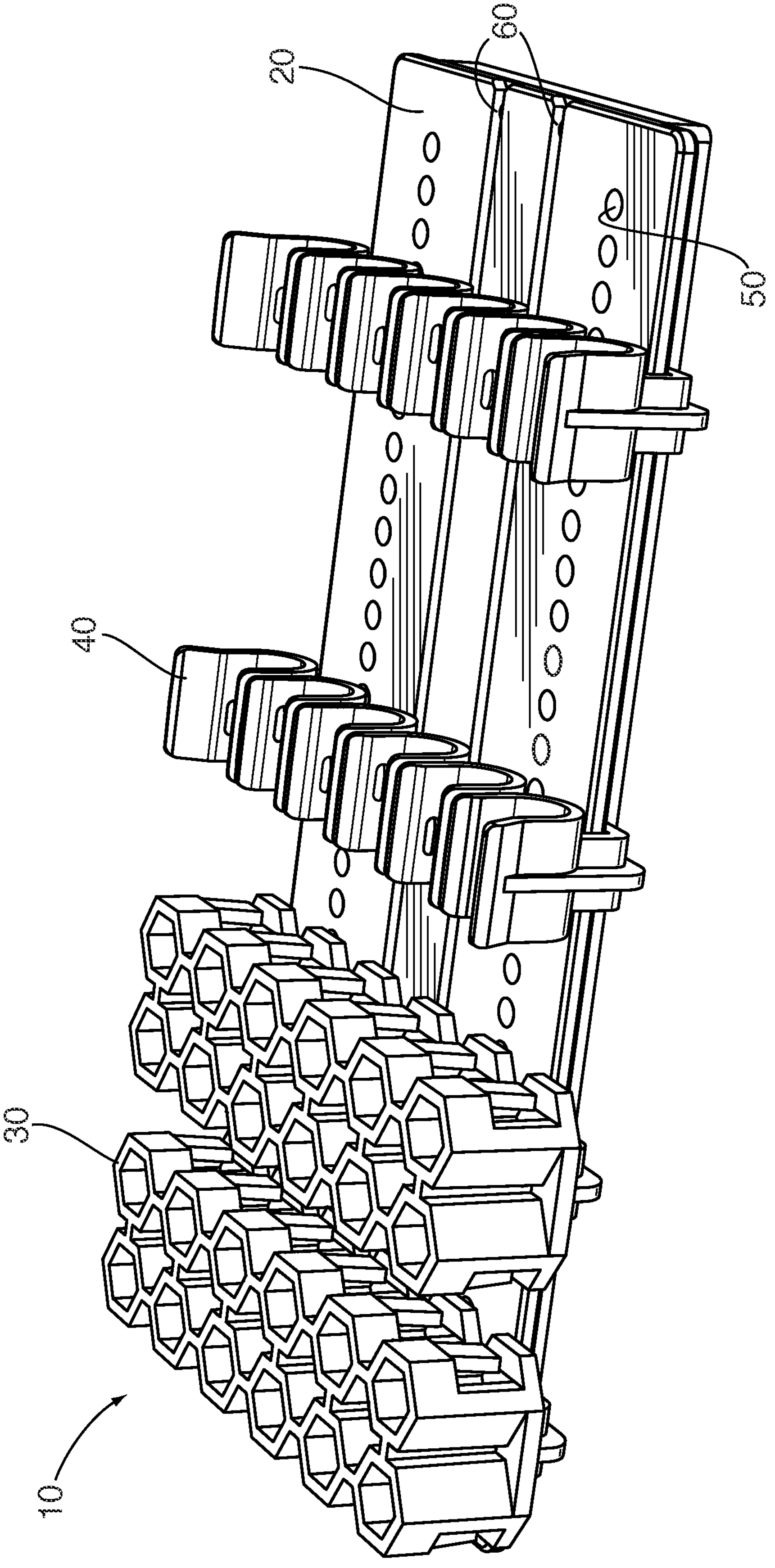
FIG. 1 is a perspective view of an embodiment of a hex bit holder system of the present invention in a first configuration.

As shown in FIG. 1, in an embodiment of the present invention there is a hex bit holder system 10 comprising a platform 20 and one or more of a first hex bit holder 30 and/or one or more of a second hex bit holder 40, which holders 30, 40 are used to organize and hold hex bits, and which enable easy removal when hex bits are needed. Hex bit are commonly 1", 2", 3.5", 6" and longer lengths. Preferably small to medium size hex bits of 1' to 2' are held in the first hex bit holder 30 and 2", 3.5", 6" and longer hex bits are held in one or more of the second hex bit holder 40. Hex bits have standard ¼" hexagonal bases at one end to attach to a drill and at the other end have either a bit to fit into a screw to act as a screwdriver or have a socket to fit over a bolt to act as a nut driver.

Figure 2:
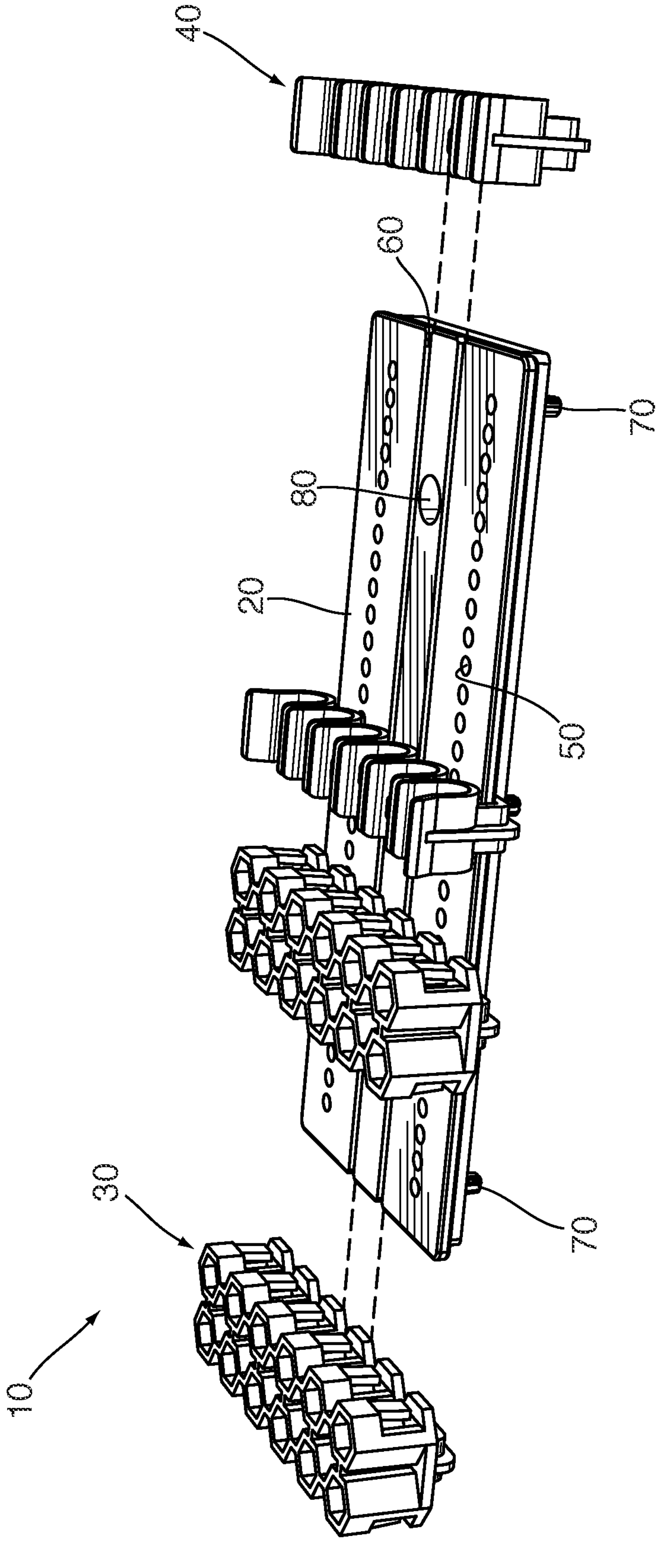
FIG. 2 is an exploded view of the hex bit holder system of FIG. 1.
Figure 3:
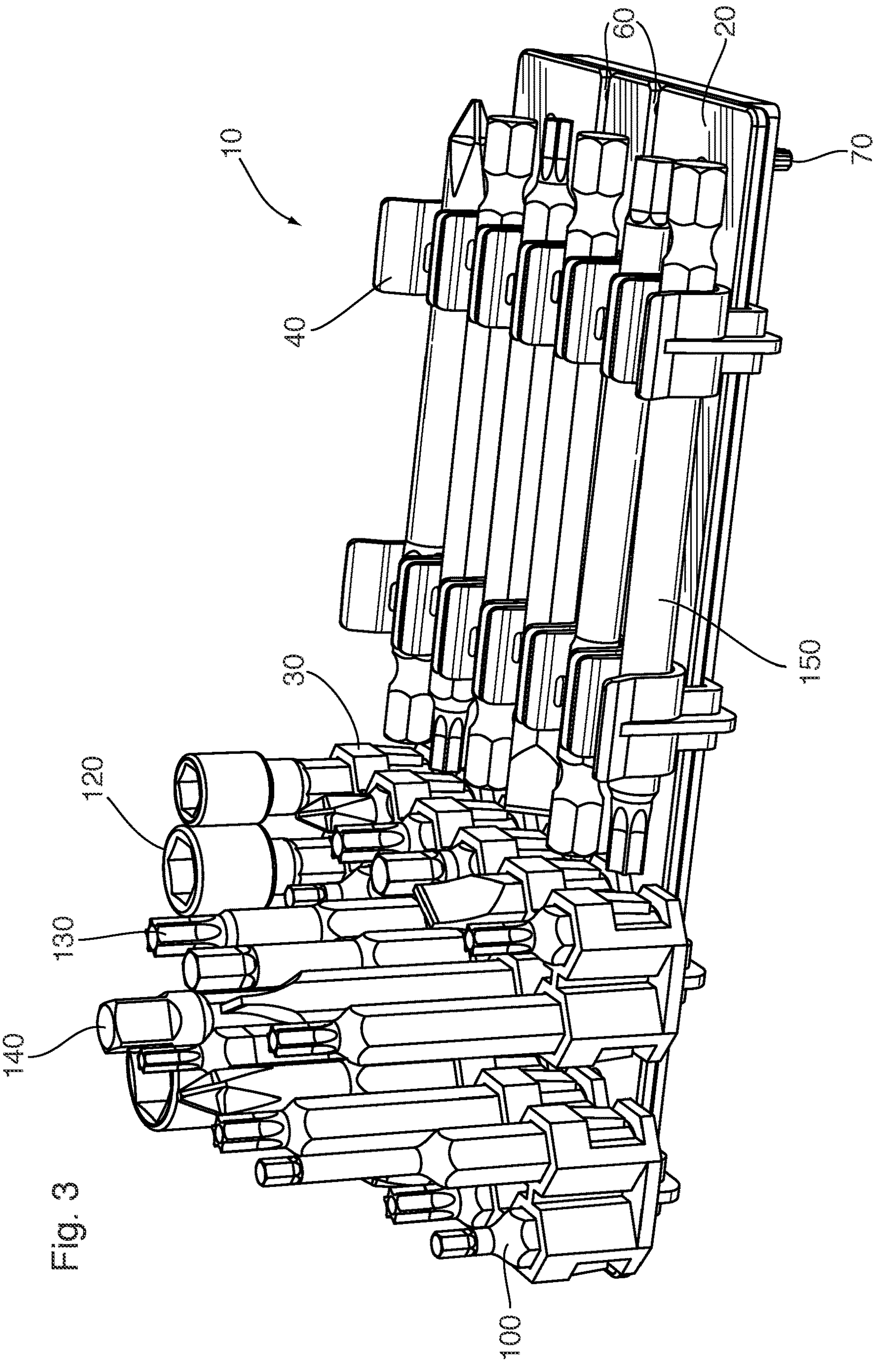
FIG. 3 is a perspective view of the hex bit holder system of FIG. 1 with hex bits.
Figures 4A, 4B, 4C, 4D, 4E, 4F:
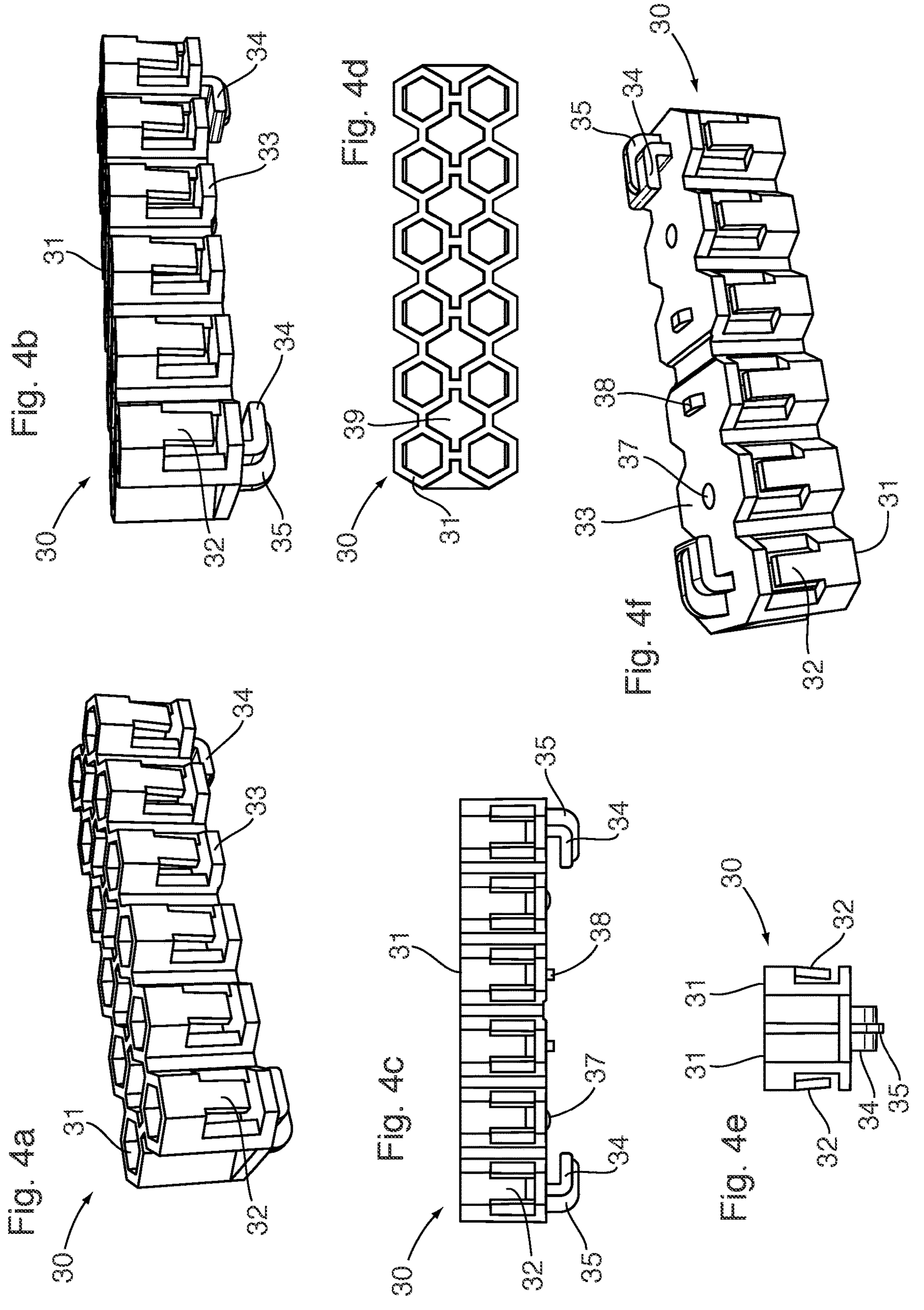
FIG. 4*a* is a top perspective view of a first hex bit holder of an embodiment of the present invention.
FIG. 4*b* is a front perspective view of the first hex bit holder of FIG. 4*a*.
FIG. 4*c* is a side view of the first hex bit holder of FIG. 4*a*.
FIG. 4*d* is a top view of the first hex bit holder of FIG. 4*a*.
FIG. 4*e* is a front view of the first hex bit holder of FIG. 4*a*.
FIG. 4*f* is a bottom perspective view of the first hex bit holder of FIG. 4*a*.
Figures 5A, 5B, 5C, 5D, 5E:
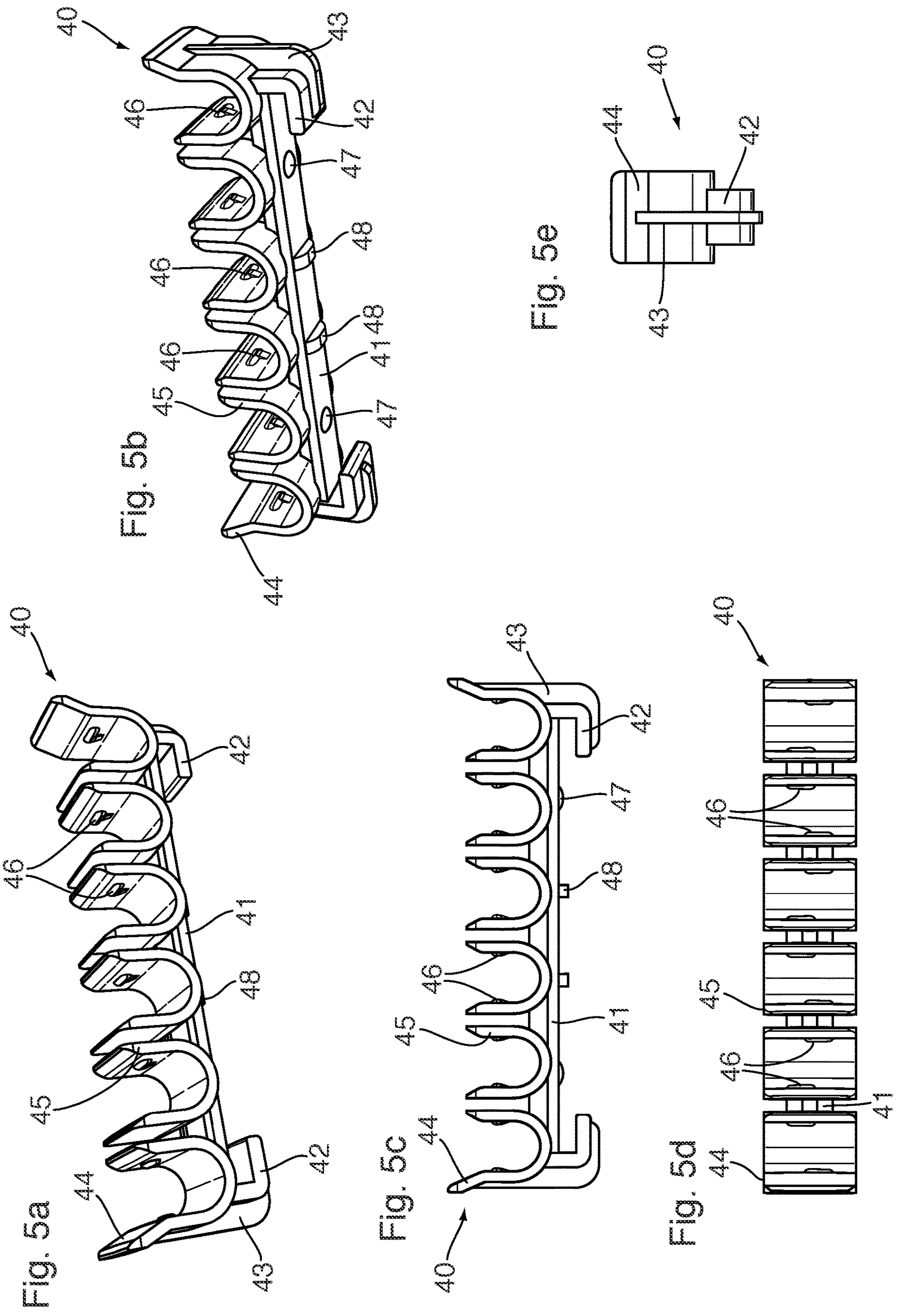
FIG. 5*a* is a top side perspective view of a second hex bit holder of an embodiment of the present invention.
FIG. 5*b* is a bottom perspective view of the second hex bit holder of FIG. 5*a*.
FIG. 5*c* is a side view of the second hex bit holder of FIG. 5*a*.
FIG. 5*d* is a top view of the second hex bit holder of FIG. 5*a*.
FIG. 5*e* is a front view of the second hex bit holder of FIG. 5*a*.

An embodiment of the hex bit holder system 10 of the present invention is shown in FIGS. 1 to 3, comprising a platform 20 with two first hex bit holders 30 and two second hex bit holders 40. The platform 20 has a rectangular body with recessed positioning stops 50 and two parallel recessed guide channels 60. Optionally there is an end bump (not shown) near the open end of each recessed channel guide 60 to prevent the hex bit holders 30, 40 from easily sliding off. As shown in FIG. 2, for use with a peg board (not shown here), the platform 20 has platform pins 70 and/or recess 80 to secure the platform 20 on a peg board. The platform 20 in this embodiment is rectangular and the first hex bit holder 30 and second hex bit holder 40 are described as sliding onto the platform in a lengthwise direction in order to provide orientation. It will be understood that the platform 20 could be square or rectangular with an opposite orientation and the hex bolt holders 30, 40 correspondingly shaped to fit on the platform 20.

As illustrated by FIG. 2, the first hex bit holder 30 can slide onto the platform 20 along recessed guide channels 60 and the second hex bit holder 40 can also slide onto the platform 20 along recessed guide channels 60. As shown in FIG. 3 the bit portion of a small hex bit 100, a medium hex bit with nut driver 120, a medium hex bit with star driver 130 and a medium hex bit with square driver 140 each fit into the first hex bit holder 30, while large hex bit 150 fits in the well over two second hex bit holders 40. It is understood that various sizes of hex bit can fit into the first hex bit holder 30 and/or one or more second hex bit holder(s) 40.

As shown in FIGS. 4*a* to 4*f*, a first hex bit holder 30 of an embodiment of the present invention comprises twelve hexagonal cavities 31 on a first hex bit holder base 33. One side of each cavity 31 has an opening with a flexible tab 32 having a first attached end extending from the top of the cavity 31 and a second free end extending into the opening, which flexible tab 32 locks a hex bit in place after it is pushed into the cavity 31. There are interior cavities 39 in the middle of each group of four cavities 31 which in this embodiment totals five interior cavities 39 that may also be used to store hex bits but without the locking feature of the flexible tabs 32. The cavities 31, flexible tab 32 and first hex bit holder base 33 are described as different parts, however, it will be understood that this may be one molded contiguous first hex bit holder.

It will be understood that, rather than having two rows, the first hex bit holder 30 could alternatively comprise one, three, four or more rows of cavities 31 (and the platform 20 could correspondingly be lengthened or shortened). There could also be less or more than six cavities 31 in a row, and if there are less or more cavities 31 in a row the width of the platform 20 would correspondingly be adjusted.

The first hex bit holder guide tabs 38 on the bottom of the first hex bit holder base 33 fit into the recessed guide channels 60 of the platform 20. The pair of rows of first hex bit holder positioning bumps 37 on the first hex bit holder base 33 have corresponding rows of recessed positioning stops 50 on the platform 20. These aid the first hex bit holder 30 in guidance/stabilizing and maintaining in place, respectively. It will be understood that other means could be used or, less effectively, these means could be reversed e.g. the first hex bit holder 30 could have recessed guide channels 60 and the platform 20 could have guide tabs 38.

First hex bit holder slide guides 34 extend widthwise from the front end and the back end in a substantially L-shape under and parallel to the first hex bit holder base 33, and the first hex bit holder 30 is guided along the platform 20 by the first hex bit holder slide guides 34 moving lengthwise along the platform 20, and when at rest the first hex bit holder slide guides 34 stabilize the first hex bit holder on the platform 20. The first hex bit holder slide guides 34 are not required, but aid with stability and guidance. While the platform 20 shown in the figures h The cavities 31, flexible tab 32 and first hex bit holder base 33 are described as different parts of the first hex bit holder, however, it will be understood that there may be one molded contiguous first hex bit holder.

As shown in FIGS. 5*a* to 5*e*, the second hex bit holder 40 of an embodiment of the present invention comprises a row of U-shaped clips 44, 45 on a second hex bit holder base 41. In this embodiment there are two outer clips 44 bordering four inner clips 45 on the second hex bit holder base 41. The arms of the clips 44, 45 have side-to-side flex to allow hex bits to snap in and out. The outer clips 44 optionally each have a longer outer arm which may be supported by the second hex bit holder slide guide support 43 but preferably not impinge the flex of the longer outer arm. The outer clips 44 and inner clips 45 optionally have a retaining bump 46 on the inner aspect of one or, preferably, both arms to hold a hex bit more securely under it, but releasably.

It will be understood that the second hex bit holder 40 could alternatively comprise two, three, four or more rows of six clips 44, 45 and such rows could have built in spacing already set for different lengths of hex bits (and the platform 20 could correspondingly be lengthened or shortened). Further there could also be less or more than six clips 44, 45 in a row and if there are less or more clips 44, 45 in a row the width of the platform 20 would correspondingly be adjusted. Similarly to the first hex bit holder 30, to glide along the platform 20 and maintain position on the platform 20, the bottom of the second hex bit holder base 41 also has a pair of second hex bit holder positioning bumps 47 and second hex bit holder guide tabs 48.

Second hex bit holder slide guides 42 extend widthwise from the front end and the back end in a substantially L-shape under and parallel to the second hex bit holder base 41, and the second hex bit holder 40 is guided along the platform 20 by the second hex bit holder slide guides 34 moving lengthwise along the platform 20, and when at rest the second hex bit holder slide guides 42 stabilize the first hex bit holder on the platform 20. The second hex bit holder slide guides 42 are not required, but aid with stability and guidance.

The parts of the second hex bit holder 40 may be combined into one molded contiguous second hex bit holder 40 provided that the flex of at least one of the pair of arms of each of the clips 44, 45 is maintained, and the clips may all be identical rather than having different outer clips.

Figure 6A:
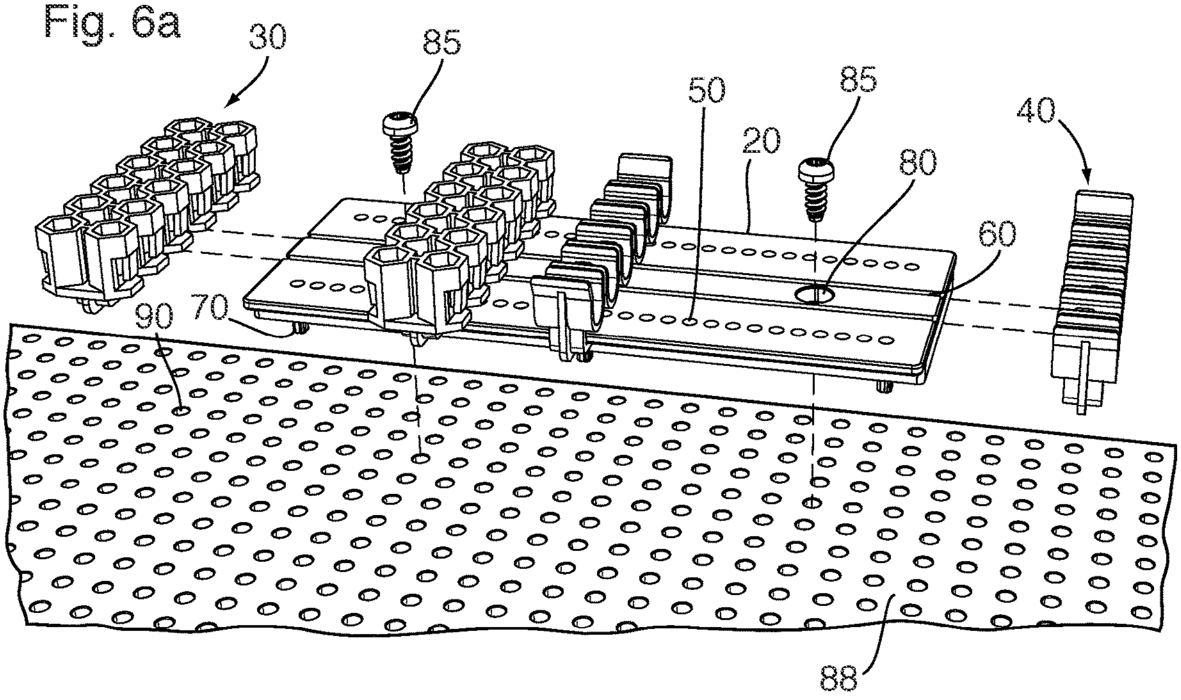
FIG. 6*a* is the hex bit holder system of FIG. 2 adjacent to a peg board.

As shown in FIG. 6*a*, the first hex bit holder 30 and second hex bit holder 40 slide onto the platform 20 from each end of the platform 20. The first hex bit holder guide tabs 38 fit into the recessed guide channels 60 and each of the first hex bit holder slide guides 34 curves around the lengthwise edge of the platform 20. The first hex bit holder 30 can slide onto the platform 20 until the desired position and click into place by lining up a pair of the first hex bit holder positioning bumps 37 with a pair of the recessed positioning stops 50. The second hex bit holder guide tabs 48 fit into the recessed guide channels 60 and each of the second hex bit holder slide guides 42 curve around the lengthwise edge of the platform 20. The second hex bit holder 40 can slide onto the platform 20 until the desired position and click into place by lining up a pair of the second hex bit holder positioning bumps 47 with a pair of the recessed positioning stops 50.

Figure 6B:
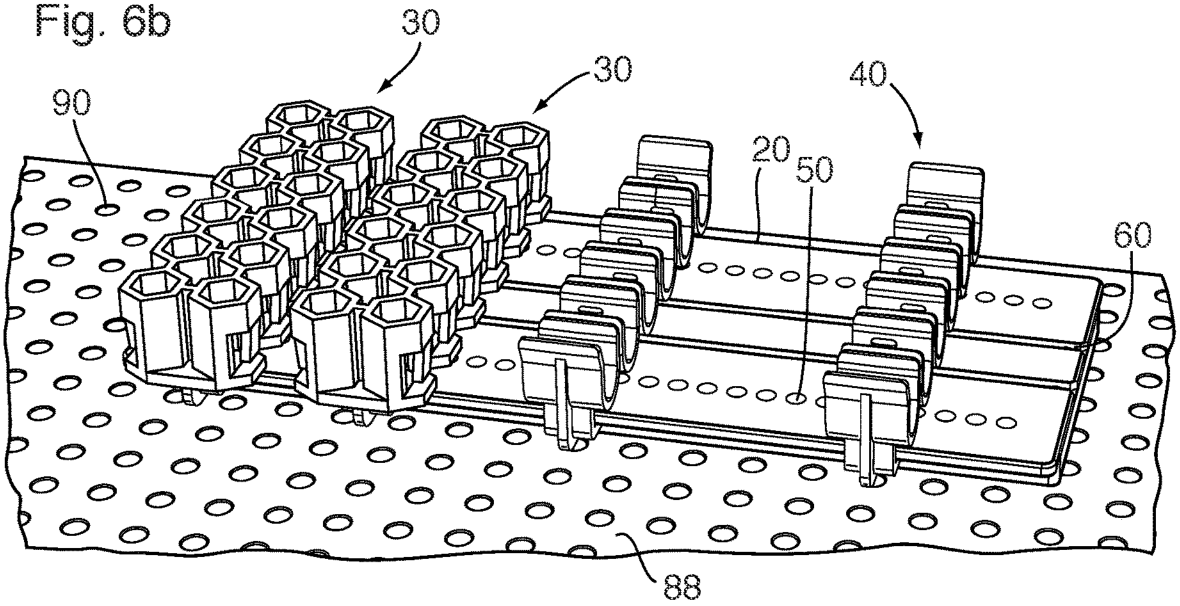
FIG. 6*b* is the hex bit holder system of FIG. 1 on a peg board.

As shown in FIGS. 6*a* and 6*b*, the platform 20 with second hex bit holders 40 and first hex bit holders 30 may be fixed to a peg board 88 by one or both of pushing platform pins 70 into peg board holes 90 and screwing screw 85 into the recess 80 and into a corresponding pegboard hole 90. The first hex bit holder 30 and second hex bit holder 40 may be moved along the platform 20 even when the platform 20 is fixed onto the peg board 88. However, if there are two platforms 20 attached to a peg board 88 next to each other lengthwise, the clip holders 30, 40 can only be removed by sliding off of the recessed guide channels 60 that remain open and do not abut another platform 20.

Figure 7A:
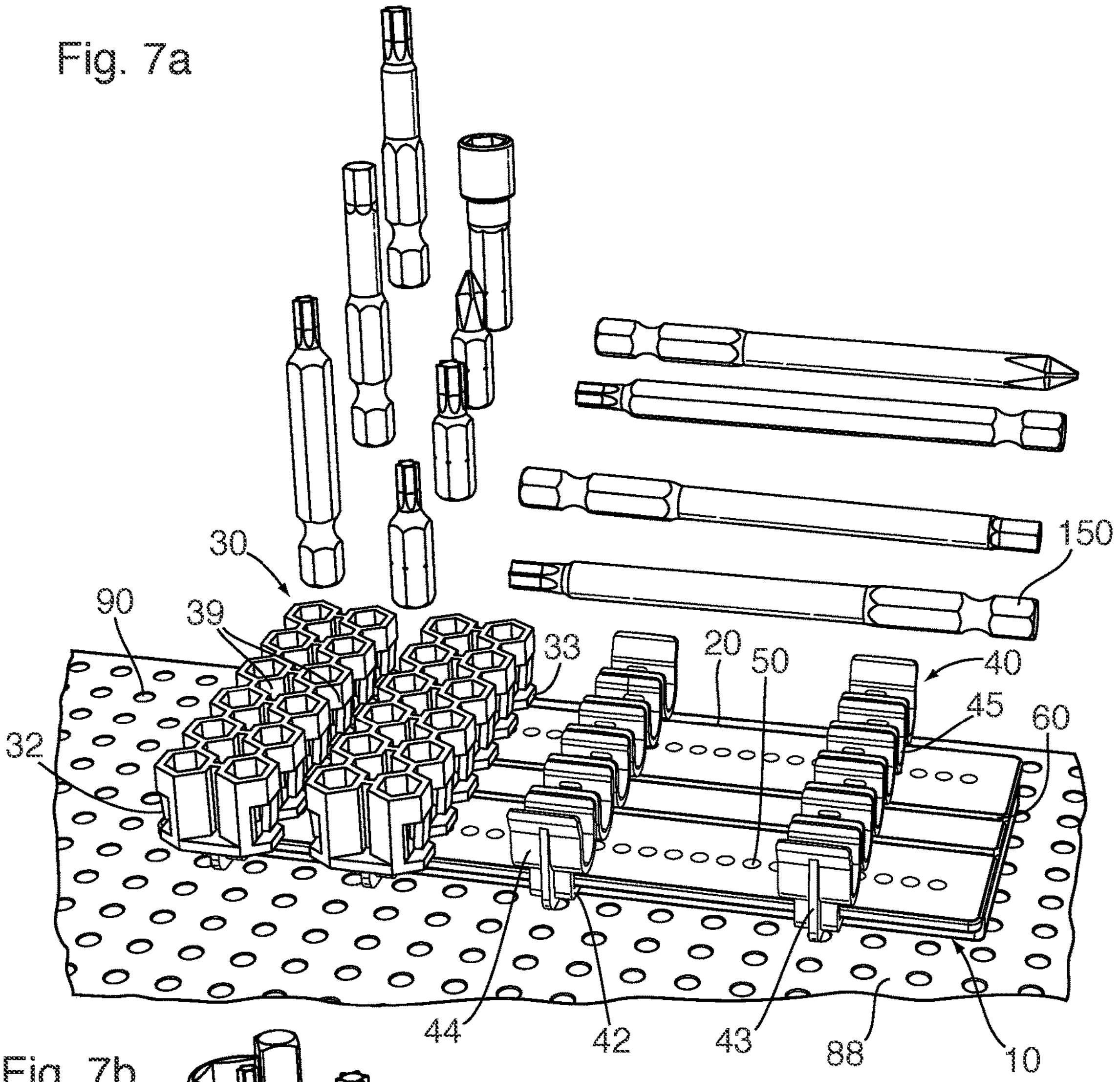
FIG. 7*a* is the hex bit holder system of FIG. 1 on a peg board with exploded hex bits.
Figure 7B:
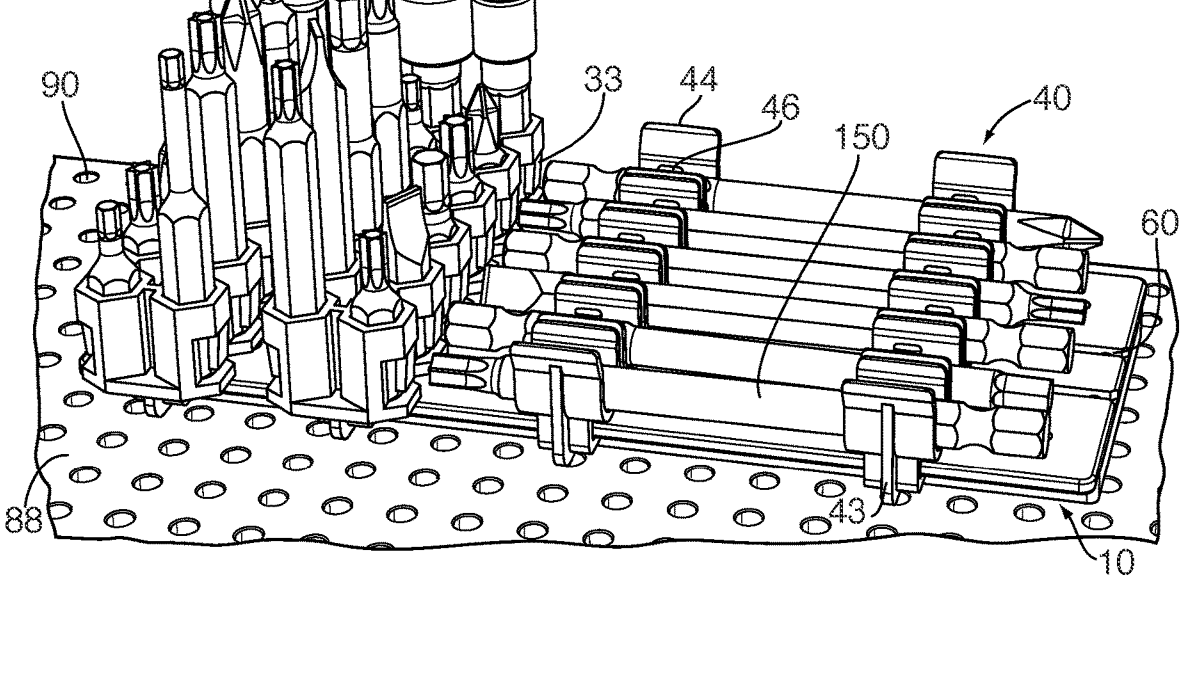
FIG. 7*b* is the hex bit holder system of FIG. 1 on a peg board with hex bits.

FIGS. 7*a*, 7*b*, 8, 9 and 10 show a variety of configurations of the hex bit holder systems 10 of the present invention. In FIG. 7*a*, a hex bit holder system 10 is shown with a pair of first hex bit holders 30 and a pair of second hex bit holders 40 before hex bits are placed in the cavities 31 and the outer clips 44 and inner clips 45. In FIG. 7*b*, two second hex bit holders 40 are shown holding large hex bits 150 which, for example, may be about 3.5".

Figure 8:
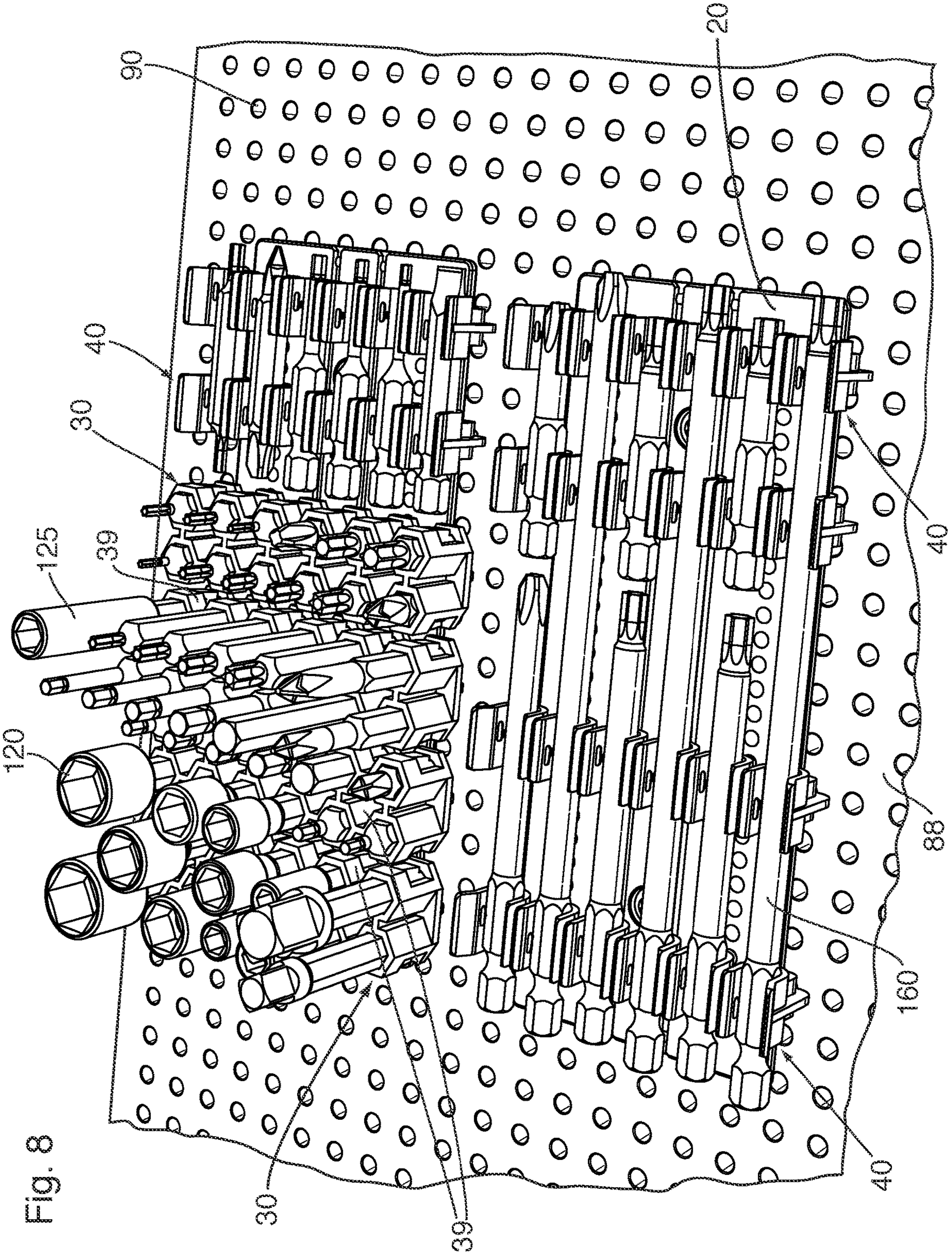
FIG. 8 is a perspective view of a hex bit holder system in a second configuration and a hex bit holder system in a third configuration on a peg board.

FIG. 8 shows two platforms 20 positioned widthwise beside each other on the peg board 88, wherein one platform 20 has four of the first hex bit holders 30 and two of the second hex bit holders 40, and one platform 20 has four second hex bit holders 40. The hex bit portions of the medium hex bit with nut driver 120 and a medium hex bit with long nut driver 125 each fit well in respective cavities 31 on two different first hex bit holders 30. An extra-large hex bit 160 which may be about 6" reaches across all four of the second hex bit holders 40. The second hex bit holders 40 can be adjusted to any length of bit which can extend onto other platforms placed lengthwise as shown in FIG. 9.

Figure 9:
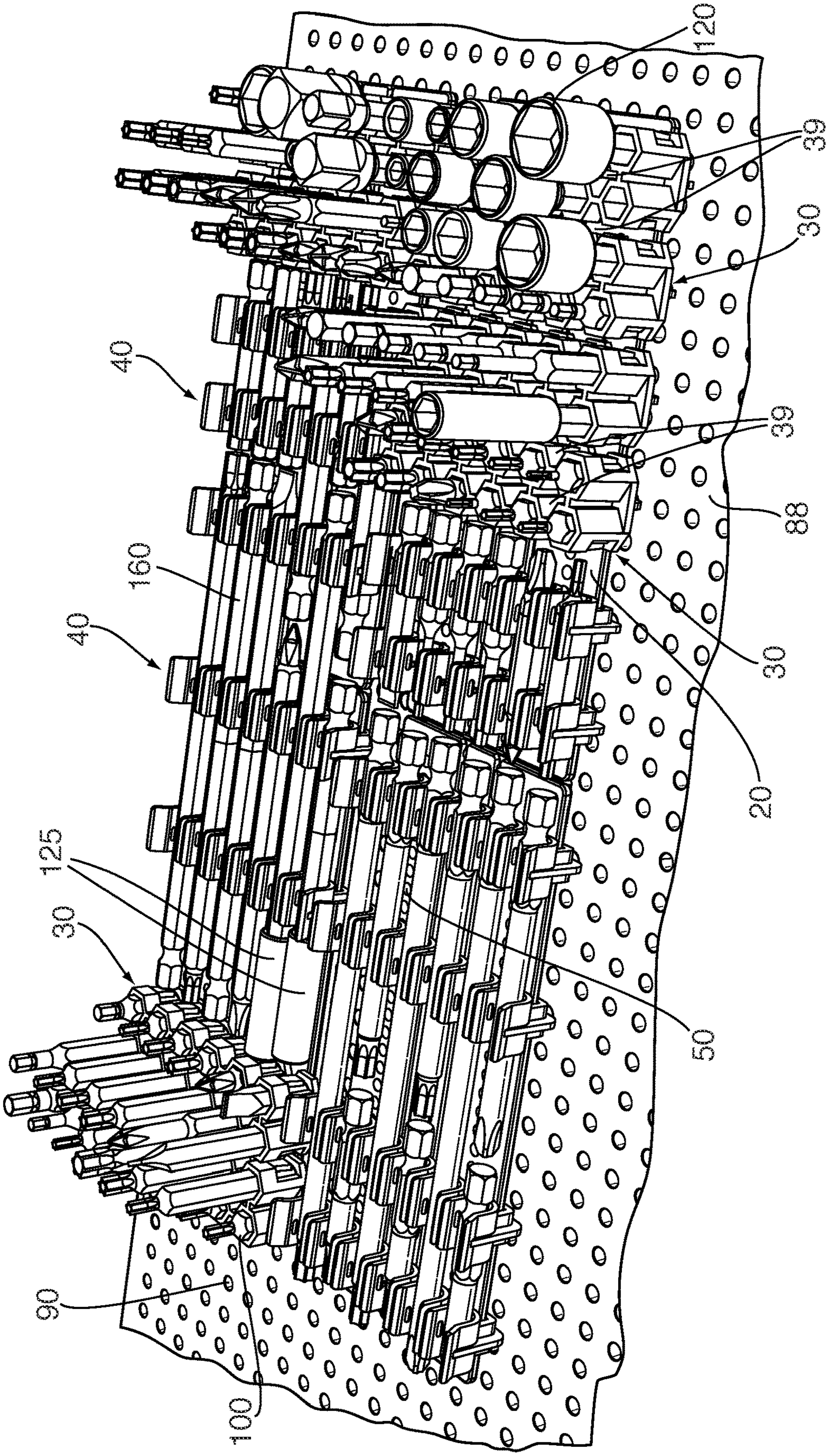
FIG. 9 is a perspective view of a hex bit holder system in a fourth configuration, a hex bit holder system in a fifth configuration, a hex bit holder system in a sixth configuration and a hex bit holder system in a seventh configuration on a peg board.

FIG. 9 shows four platforms 20 on a peg board 88. Long hex bits can be held over more than one platform 20 and in multiple second hex bit holders 40. As shown with extra-large hex bit 160, since two platforms 20 are lined up lengthwise, it overlaps over two platforms 20 and three respective second hex bit holders 40. The number of second hex bit holders 40 selected for extra-large hex bit 160 is three second hex bit holders 40 in FIG. 9 and four second hex bit holders 40 in FIG. 8. The socket or nut driver portion of the medium hex bit with long nut driver 125 may not fit in a cavity 31 or in an outer clip 44 or an inner clip 45, but the hex bit portion fits in a cavity 31 and, as shown in FIG. 9, also fits in an outer clip 44 or an inner clip 45.

Figure 10:
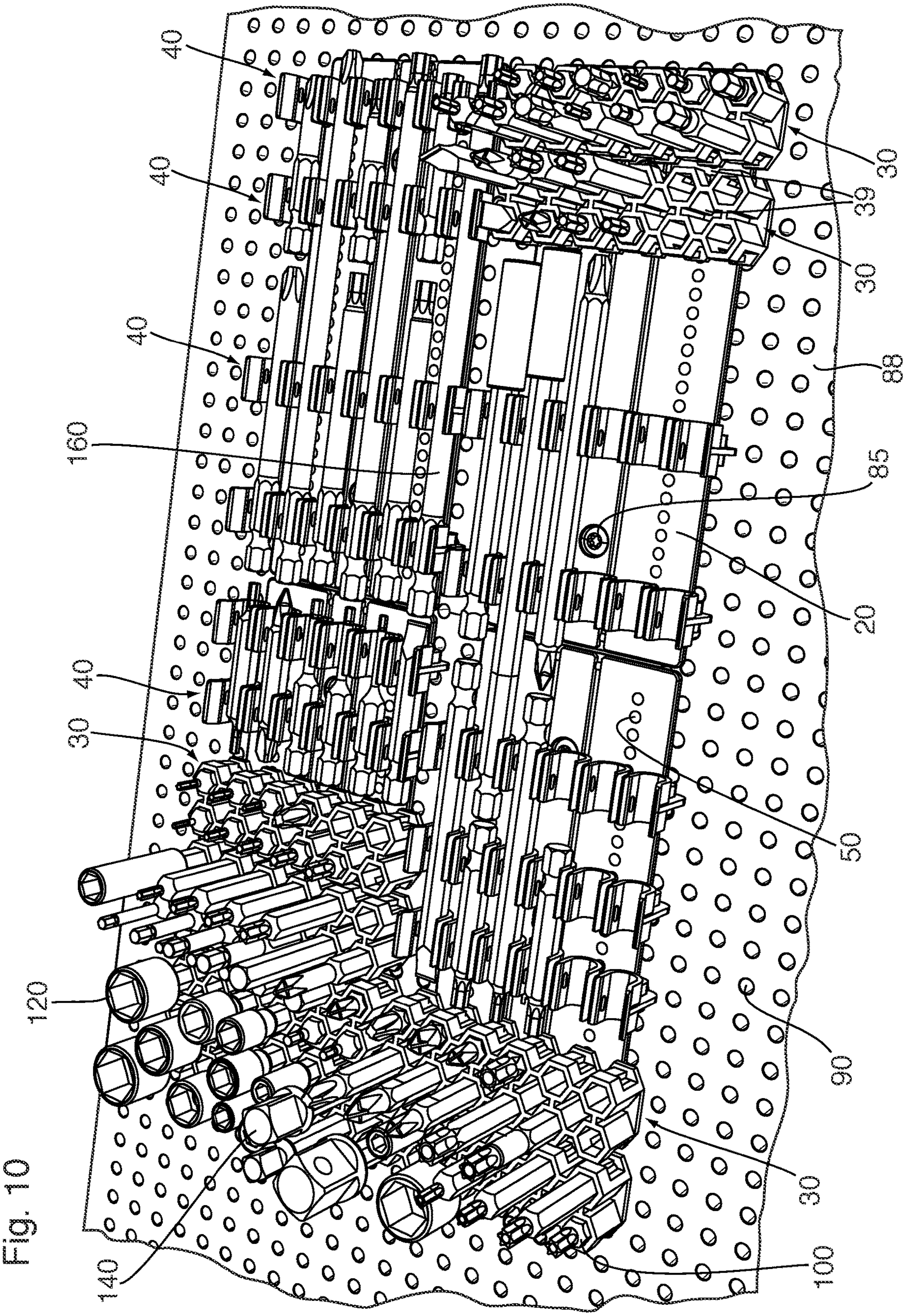
FIG. 10 is an opposite side perspective view of the hex bit holder systems of FIG. 9.

FIG. 10 shows the four platforms 20 on a peg board 88 of FIG. 9 from the opposite side with some of the hex bits missing from the first hex bit holders 30 and from the second hex bit holders 40 which better shows the screw 85 and recessed positioning stops 50. The first hex bit holders 30 when positioned side by side as shown in FIG. 10 create further interior cavities 39 between two first hex bit holders 30 which may additionally hold hex bits, although without the locking feature.

Various configurations of hex bit holders 10 with different numbers and combinations of first hex bit holders 30 and/or second hex bit holders 40 can be designed and redesigned with the present invention. The number of platforms 20 and the number of first hex bit holders 30 and/or second hex bit holders 40 per platform can be arranged by a user based on the quantity and sizes of hex bits (as well as personal preference related to functional and/or aesthetic needs), and additional hex bit holders 10 may be assembled to accommodate additional hex bits.

In operation, when using the first hex bit holder 30, the end portion of a hex bit is pressed into the cavity 31 which pushes the flexible tab 32 outward. The hex bit may be pushed in until the bottom of the hex bit reaches the hex bit base 33 and the pressure of the flexible tab 32 against the hex bit holds the hex bit in place. The flexible tab 32 also allows the bit portion to be visibly seen to be fully engaged in a cavity 31. The flexible tab 32 of the cavity 31 releases even hard to grip 1" hex bits easily.

In operation, when using the second hex bit holder 40, the side (rather than the end) of a hex bit is pushed into a clip 44, 45 which causes the arms to flex outward and then spring back once the hex bit is at the bottom of the clip 44, 45. When included, the retaining bumps 46 on the outer clips 44 and inner clips 45 hold hex bits securely on the bottom of a clip 44, 45, but also easily release hex bits.

On a flat surface, the platform 20 holds hex bits vertically in the first hex bit holders 30 and holds hex bits horizontally in the second hex bit holders 40 (and vice versa if the platforms 20 are on a peg board 88 which is suspended vertically on a wall).

As seen from the figures, the first hex bit holder 30 and second hex bit holder 40 can be moved along the platforms 20, and the number of first hex bit holders 30 and/or second hex bit holders 40 on a platform 20 chosen based on the hex bits to hold, functional and aesthetic preference. For the second hex bit holders 40 the desired level of hold on the hex bits can be increased my using more second hex bit holders 40. The number of platforms 20 on a peg board 88 may be chosen based on the number of hex bits and horizontal or vertical orientation of the peg board, as well as the strength of the peg board. While a peg board 88 allows any orientation of multiple platforms 20, fixing the platforms 20 lengthwise on a peg board permits large hex bits, to overlap more than one platform, as shown in FIG. 9.

A platform 20 may remain detached from a peg board 88 and carried around, or stacked in a tool box, in which case the platform 20 would not need to have platform pegs 70 and recess 80.

The ¼" hexagon is the current standard size of the hex bits shown in the figures, however, it will be understood that if the size of the hex bit portion changed that the first hex bit holders 30 and second hex bit holders 40 could correspondingly change in size. For aesthetic purposes the figures do not show hex bits reaching longer than the platform 20, but that is possible.

The platforms 20 may be 6" long and 3" wide with correspondingly sized first hex bit holders 30 and second hex bit holders 40, but it will be understood that the platforms 20 and correspondingly sized holders 30, 40 could be larger or smaller.

The platform 20 and hex bit holders 30, 40 can be made of plastic that is durable and flexible. For example, the parts can be made of Polyoxymethylene (POM) or Polyacetal Plastic or from other plastics such as, Polypropylene (PP) or nylon.

While embodiments of the invention have been described in the detailed description, the scope of the claims should not be limited by the preferred embodiments set forth in the examples but should be given the broadest interpretation consistent with the description as a whole.

What is claimed is:

1. A hex bit holder comprising:

a base with at least one row of cavities, each cavity being hexagonally shaped, open at the top, and with a further opening across a lower half, a flexible tab extending from the top of each cavity and bisecting and curving into the opening; and a pair of hex bit holder positioning bumps and a pair of hex bit holder guide tabs extending downward from a bottom of the hex bit holder base, and a pair of hex bit holder slide guides which extend widthwise in a substantially L-shape under and parallel to the hex bit holder base.

2. The hex bit holder of claim 1, wherein there are six cavities in each of the rows.

3. A hex bit holder system comprising a platform for hex bit holders and at least one of the hex bit holder of claim 1.

* * * * *